June 22, 1954

C. S. SHIELDS 2,681,578

TWO-SPEED DRIVE

Filed May 20, 1950

2 Sheets-Sheet 1

INVENTOR.
CARL S. SHIELDS
BY
*Richey & Watts*
ATTORNEYS

June 22, 1954 C. S. SHIELDS 2,681,578
TWO-SPEED DRIVE
Filed May 20, 1950 2 Sheets-Sheet 2

INVENTOR.
CARL S. SHIELDS
BY
ATTORNEYS

Patented June 22, 1954

2,681,578

UNITED STATES PATENT OFFICE 2,681,578

TWO-SPEED DRIVE

Carl S. Shields, Wickliffe, Ohio

Application May 20, 1950, Serial No. 163,278

7 Claims. (Cl. 74—665)

The present invention relates generally to the power transmission art and is more particularly concerned with a novel multiple speed one-way drive assembly including an over-running clutch and in which the centers of the driving and the driven members are readily initially established and are automatically maintained in operation.

In driving assemblies in which worms and worm gears are employed, the relative positions of the driving and driven members at all times is of prime importance. When these members get even slightly out of position, the worm becomes a cutter and mills the gears it engages so that they rapidly are destroyed. Accordingly, considerable effort and thought has heretofore been applied by others to the problems of initially fixing the driving and driven members and their gears in position and keeping them in their position for long periods of operation to reduce substantially the cost of operating these gears and maintaining the transmissions incorporating them. To the best of my knowledge, however, no one has ever been able to conceive of a satisfactory solution to either of these problems.

By virtue of the present invention, initial positioning of the gears in an assembly including a worm and worm gear, for example, can easily and rapidly be made. Furthermore, this invention enables automatic maintenance of this initial desired relationship between the gears and the driving and driven members of the assembly. In other words, this invention constitutes the first satisfactory solution to each of the aforesaid problems. As a further advantage, this invention can be applied generally to advantage in all transmissions including a worm and a worm gear. Still further, the economy of my invention is such that transmissions incorporating it are no more difficult or expensive to make than any conventional commercial types and, as indicated above, they are substantially less expensive to assemble and operate than those heretofore known.

Figure 1:
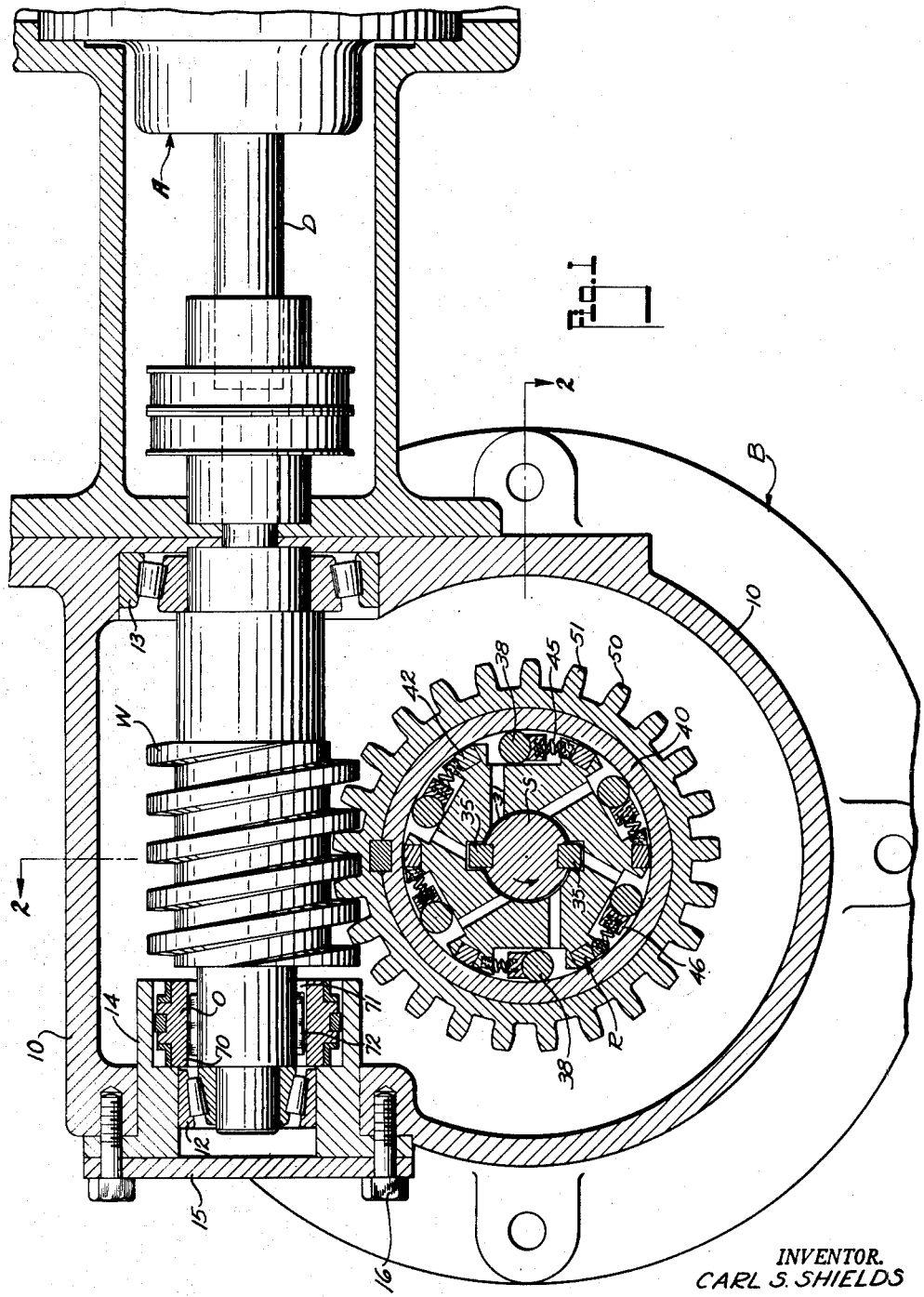
Figure 2:
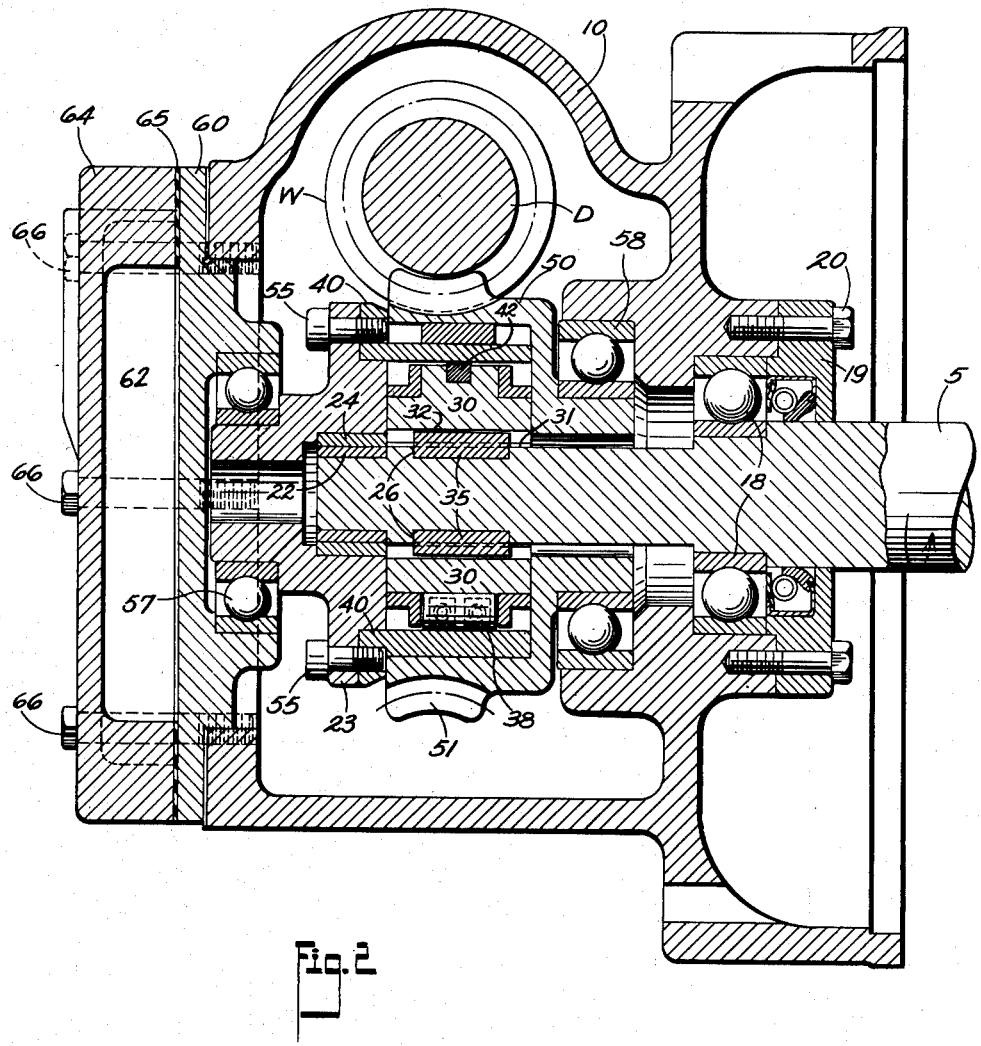

Those skilled in the art will gain a further understanding of this invention upon reference to the drawings accompanying and forming a part of this specification, in which:

Fig. 1 is a sectional view of a two-speed, one-way drive assembly embodying this invention in a preferred form; and, Fig. 2 is a sectional view taken on line 2—2 of Fig. 1.

The illustrated assembly is of general utility and may be employed, for instance, in a conventional type of dry cleaning machine (not shown) wherein at different times in the cleaning cycle it is desirable to drive the drum at different speeds. In this assembly, a motor A is provided to drive the drum at a relatively slow rate and a motor B is provided to drive the drum at a more rapid rate. These two motors are operatively associated with each other through the illustrated gear assembly G of this invention in such a way that when motor A is running it turns driving shaft D and through assembly G turns drive shaft S, and when motor B is running shaft S is turning but shaft D is stopped. An over-running clutch C, subsequently to be described, is employed to obtain these results and is carried by shaft S.

Motors A and B and shafts D and S are enclosed in a housing 10 of a plurality of parts bolted, screwed or otherwise secured together in a conventional manner. Shaft D is journalled at its free end and at its mid-section in roller bearings 12 and 13, respectively, which are in turn supported in openings provided for the purpose in the housing, as shown in Fig. 1, a sleeve 14 being removably disposed in an access opening in the housing and telescopically related to the free end of shaft D to contain and carry bearing 12. Between these bearings, a worm W is provided and is integral with shaft D. The purpose of the access opening is to enable the operator to reach the bearings and worm W easily, but this opening is normally closed fluid-tightly during operation by a plate 15 secured by bolts 16 to the housing. An over-running clutch O, subsequently to be described, also is contained in and carried by sleeve 14 and is operatively associated with shaft D adjacent to its free end to lock said shaft against counter-rotation under forces delivered from the driven shaft S.

Shaft S is likewise journalled in housing 10, a ball bearing 18 being provided for engagement with the shaft between its ends and the housing being formed to receive bearing 18 and fitted with a plate 19 held in place by means of bolts 20 to retain this bearing. At its free end, shaft S is provided with an annular bearing ring 22 for engagement with a similar part 24 in the axial bore a cap piece 23 receiving said end of shaft. Shaft S is also provided with a pair of diametrically-opposed keyways 26 extending lengthwise of the shaft adjacent to its free end.

The over-running clutch assembly R carried by shaft S comprises a body 30 of generally cylindrical shape and having an enlarged axial bore 31 to receive the free end of shaft S. Body 30 also has a pair of diametrically-opposed keyways 33 to receive a pair of keys 35. Keys 35, having portions slightly smaller than keyways 33 for receipt in said keyways 33 permit limited angular and radial motion of body 30 relative to shaft S, the purpose of which will subsequently be explained. Grippers G complete clutch assembly R and comprises rollers 38 disposed in spaced rectangular recesses in the outer periphery of body 30, and held in place radially by a cylindrical shell or bushing 40 in which the clutch assembly is contained. Body 30 defines an outer annular space with bushing 40 with an approximate clearance of about $\frac{1}{16}$ inch being provided between spaced bearings 42 as the outermost portions of body 30 and the inside surface of said bushing. The art will understand that the amount of clearance provided for floating effect of the clutch body relative to bushing 40 and gear 50 may vary considerably without altering the mode of operation or results of the device of this invention. The chief consideration is the relation between body 30, rollers 38 and bushing 40 whereby wedging of the rollers will be insured when it is desired to make the clutch effective in transmitting rotational motion from the said bushing to the driven shaft. In the present assembly these rollers are resiliently urged into wedging engagement between body 30 and bushing 40 by means of springs 45 secured to the body and compressed between the body and the rollers, the free ends of the springs adjacent to the rollers being secured to pressure blocks 46 which are provided on one side with a cylindrical surface for engagement with substantial areas of said rollers 38.

A worm gear 50 receives over-running clutch assembly R, bushing 40 being keyed to said worm gear for rotation therewith, and is provided with teeth or splines 51 to mesh with the teeth of the worm W. Bushing 40, as shown in Fig. 2, is secured to cap 23 by means of bolts 55 which bear upon gear 50 so that the cap piece, cylinder and gear 50 will rotate as a unit. To this end, cap 23 is journalled in ball bearing 57 while gear 50 is journalled in ball bearing 58, these bearings in turn being fitted in appropriately formed parts of housing 10 and retained by the housing against radial movement or axial motion away from each other.

From the foregoing description, it will be appreciated that not only may cap 23, bushing 40 and gear 50 be considered an element, but these parts and over-running clutch assembly R may be assembled as a unit on shaft 5, ball bearings 57 and 58 and keys 35 being assembled with the unit and serving as a part thereof, if desired. The end of housing 10 adjacent to free end of shaft S is provided with an access opening to facilitate installation or removal of this unitary assembly. A closure plate 60 is provided for this opening and as indicated above, is formed appropriately to receive bearing 57 in its inner face. A cooling liquid chamber 62 is defined outside the housing proper and adjacent to the free end of shaft S by a recessed plate 64, plate 60 and a gasket 65 disposed therebetween. Plate 64 is secured in position against plate 60 by means of bolts 66, and is provided with the usual inlet and outlet ports (not shown) and means (also not shown) for flowing a cooling fluid such as water under pressure to and from chamber 62 for heat exchange effect upon plate 60 and the lubricant within housing 10.

Over-running clutch assembly O is basically and essentially the same in structure, mode of operation and results as clutch assembly R. Assembly O includes a clutch body 70 which is generally cylindrical and has an axial bore 71 which may be enlarged to receive shaft D. The clutch body 70 includes diametrically opposed keyways in which a pair of keys 72 carried by shaft D are received in such a way that a limited clearance is provided for a floating effect of the body 70 relative to shaft D. Assembly O in addition has rollers, springs and pressure blocks (not shown) like assembly R and has a clearance between body 70 and the opposed inner surface portion of sleeve 14, as shown.

In the operation of the illustrated device, as indicated above, motor A drives a dry cleaner drum or other similar device through shaft S and motor B so long as the speed of motor A is sufficient to assure wedging of rollers 38 against body 30 and bushing 40. On the other hand, when motor B is the effective driving means and motor A is stopped or is running so slowly as not to have the said wedging effect, rollers 38 are positioned in the peripheral recesses of the body so that they ride freely and without wedging effect upon bushing 40. When this latter condition obtains, there is little or no tendency for the over-running clutch to cause mis-alignment of the gears with the results stated above. However, when driving is being accomplished through the worm and the rollers are wedged, forces are often not symmetrically distributed around shaft S and there is a tendency for this shaft to be thrown off center. This would result in this structure and gear 50 would be milled by worm W but for the fact that body 30 is free to move to a limited extent radially and angularly relative to shaft 5 and bushing 40 and gear 50 to equalize the distribution of forces applied by the clutch to said shaft.

It is apparent from the foregoing description that clutch assembly O will permit rotation of shaft D in one direction and will prevent its rotation in the opposite direction. It is also apparent that by virtue of the fact that the clutch body 70 floats on shaft D and the fact that said body also floats in sleeve 14, the required clutch effects are obtained at all times without the undesirable effects of misalignment caused by the unbalanced application of heavy loads to shaft S.

Having thus described the present invention so that those skilled in the art will be able to gain a better understanding and practice the same, I state that what I desire to secure by Letters Patent is defined in what is claimed.

What is claimed is:

1. A two-speed, one-way drive assembly comprising a worm driving member on a fixed center, a driven member on another fixed center and spaced from the driving member, a worm gear on the driven member to mesh with said worm driving member and defining an annular space with the driven member, bearing means for said worm gear separate from said driven member for maintaining a fixed relation between the said worm driving member and said worm gear, over-running clutch means on the driven member and within said annular space, said clutch means floating within predetermined limits with respect to both said driven member and worm gear and including an annular body defining an annular outer space with the worm gear, said body having an axial bore to receive said driven member and define therewith an annular inner space and having a radially extending recess opening into said bore, and means including a key rotatable with and projecting from the driven member for receipt in said recess in the clutch body for transmitting rotational motion between said body and driven member, said key being of reduced cross-section relative to said recess for limited angular and radial motion relative to the said clutch body, whereby engagement of the worm driving member with the worm gear is unaffected by the motion of the driven member.

2. A two-speed, one-way drive assembly comprising a fixed member, a worm driving member on a fixed center through said member, a driven member on another fixed center and spaced from the driving member, an over-running clutch associated with the said worm driving member and cooperating with said fixed member, a worm gear on the driven member to mesh with said worm driving member and defining an annular space with the driven member, over-running clutch means on the driven member and within said annular space, said clutch means floating within predetermined limits with respect to both said driven member and worm gear and including an annular body defining an annular outer space with the worm gear, and gripping means resiliently attached to the body to wedge between the body and said worm gear, said body having an axial bore to receive said driven member and define therewith an annular inner space and having a radially extending recess opening into said bore, and means including a key rotatable with and projecting from the driven member for receipt in said recess in the clutch body for transmitting rotational motion between said body and driven member, said key being of reduced cross-section relative to said recess for limited angular and radial motion relative to the said clutch body, whereby the driven member may be driven by the worm driving member when the speed of the worm gear exceeds that of the driven member.

3. A gear drive mechanism comprising a shaft, a gear on the shaft and defining an annular space with said shaft, a bearing member for said shaft supported in the gear at one side of the annular space and the gear fitting loosely over the shaft at the other side of the annular space, over-running clutch means on the driven member and within said annular space, said clutch means floating within predetermined limits with respect to both said shaft and gear and including an annular body defining an annular outer space with the gear, said body having an axial bore to receive said shaft and define therewith an annular inner space and having a radially extending recess opening into said bore, and means including a key rotatable with and projecting from the shaft for receipt in said recess in the clutch body for transmitting rotational motion between said body and driven member, said key being of reduced cross-section relative to said recess for limited angular and radial motion relative to the said clutch body.

4. A two-speed, one-way drive assembly comprising a fixed member, a worm driving member on a fixed center through said fixed member, a driven member on another fixed center and spaced from the driving member, an over-running clutch associated with said worm driving member and cooperating with the said fixed member, a worm gear on the driven member to mesh with said worm driving member and defining an annular space with the driven member, bearing means for said worm gear separate from said driven member for maintaining a fixed relation between said worm driving member and said worm gear, over-running clutch means on the driven member and within said annular space, said clutch means floating within predetermined limits with respect to both said driven member and worm gear and including an annular body defining an annular outer space with the worm gear, said body having a central bore to receive said driven member and define therewith an annular inner space and having a radially extending recess opening into said bore, and means operatively associated with said body and driven member for transmitting rotational motion therebetween, said latter means permitting relative angular and radial motion of said body and driven member within predetermined limits, whereby the driven member may be driven by the worm driving member when the speed of the worm gear exceeds that of the driven member and the worm gear is continuously positioned for optimum cooperation with the worm driving member.

5. In a gear drive mechanism, a driven member, a drive member coaxial with the driven member and defining an annular space with the driven member, bearing means for said driven member supported by said driving member at one side of said annular space, and a coaxial space between said members at the remaining side of said annular space, clutch means within the annular space including a generally annular body having a central bore to receive said driven member, the bore being dimensioned to provide a radial clearance between the annular body and the driven member and having a recess opening extending radially from said bore, and a key associated with the driven member and extending into the recess, the key and recess being dimensioned to provide radial and circumferential clearance for permitting relative angular and radial motion of the annular body relative to the driven member.

6. A two-speed drive mechanism comprising a housing, a first shaft mounted in said housing, an over-running clutch member on the said first shaft and adapted to engage an annular portion of the housing surrounding said member, a worm on said first shaft, a worm gear mounted in said housing and adapted to engage and be driven by said worm, said worm gear including a shaft opening, an annular space within the gear, bearings for said worm gear mounted in the said housing and supporting said worm gear in fixed relation to said worm, a second shaft mounted in said housing and disposed to rotate within the said shaft opening in the said worm gear, and a bearing mounted in said worm gear for supporting said shaft and over-running clutch means in the annular space within the worm gear and secured to said shaft for transmitting motion between said worm gear and said shaft.

7. A two-speed drive mechanism comprising a housing, a first shaft mounted in said housing, an over-running clutch member on the said first shaft and adapted to engage an annular portion of the housing surrounding said member, a worm on said first shaft, a worm gear mounted in said housing and adapted to engage and be driven by said worm, said worm gear including a shaft opening and an annular space within the gear, bearings for said worm gear mounted in the housing and supporting the said worm gear in fixed relation to said worm, a second shaft mounted in said housing and disposed to rotate within the said shaft opening in the said worm gear, and a bearing mounted in said worm gear for supporting said shaft and an over-running clutch member in the annular space within the worm gear and secured to said shaft for transmitting motion between said worm gear and said shaft by a key and recess dimensioned to provide circumferential clearance therebetween.

References Cited in the file of this patent

UNITED STATES PATENTS

| Number | Name | Date |
|---|---|---|
| 455,549 | Sternoff-Beyer | July 7, 1891 |
| 1,375,576 | Duca | Apr. 19, 1921 |
| 1,465,486 | Sandiford | Aug. 21, 1923 |
| 1,951,875 | Laabs | Mar. 20, 1934 |
| 2,029,094 | DeVlieg et al. | Jan. 28, 1936 |
| 2,069,558 | Raven et al. | Feb. 2, 1937 |
| 2,082,842 | Marland | June 8, 1937 |
| 2,096,438 | Rockwell | Oct. 19, 1937 |
| 2,105,914 | Fritzsch | Jan. 28, 1938 |
| 2,172,653 | Flogaus | Sept. 12, 1939 |
| 2,281,569 | Fritzsch | May 5, 1942 |
| 2,299,739 | Colucci | Oct. 27, 1942 |
| 2,370,580 | Pyne et al. | Feb. 27, 1945 |
| 2,402,829 | Moo | June 25, 1946 |
| 2,423,243 | Lovely | July 1, 1947 |
| 2,551,980 | Tholl | May 8, 1951 |